(12) United States Patent
Pang et al.

(10) Patent No.: US 6,683,590 B1
(45) Date of Patent: *Jan. 27, 2004

(54) TRICOLOR LED DISPLAY SYSTEM HAVING AUDIO OUTPUT

(75) Inventors: Grantham Kwok-Hung Pang, Hong Kong (CN); Edward S. Yang, Menlo Park, CA (US); To-On Kwan, Hong Kong (CN); Chi-Ho Chan, Hong Kong (CN); Ka-Lim Ho, Hong Kong (CN)

(73) Assignee: The University of Hong Kong, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 09/646,649

(22) PCT Filed: Mar. 19, 1999

(86) PCT No.: PCT/IB99/00891

§ 371 (c)(1),
(2), (4) Date: Nov. 10, 2000

(87) PCT Pub. No.: WO99/49446

PCT Pub. Date: Sep. 30, 1999

Related U.S. Application Data

(60) Provisional application No. 60/078,685, filed on Mar. 20, 1998.

(51) Int. Cl.[7] .................................................. G09G 3/32
(52) U.S. Cl. .......................... 345/82; 345/83; 340/815.45
(58) Field of Search ............................ 345/82, 83, 39, 345/84; 348/801, 802; 340/901–903, 905, 906, 815.4, 815.45, 815.53

(56) References Cited

U.S. PATENT DOCUMENTS

| 4,229,727 A | 10/1980 | Gilhooley |
|---|---|---|
| 4,761,800 A | 8/1988 | Lese et al. |
| 4,841,200 A | 6/1989 | Cleary, Jr. et al. |
| 5,184,114 A | 2/1993 | Brown |
| 5,187,810 A | 2/1993 | Yoneyama et al. |
| 5,289,184 A | 2/1994 | Suzuki |
| 5,315,295 A | 5/1994 | Fujii |
| 5,444,742 A | 8/1995 | Grabow et al. |
| 5,559,707 A | 9/1996 | DeLorme et al. |
| 5,570,140 A | 10/1996 | Toide et al. |
| 5,633,629 A | 5/1997 | Hochstein |
| 5,635,920 A | 6/1997 | Pogue et al. |
| 5,661,583 A | 8/1997 | Nhu |
| 5,819,198 A | 10/1998 | Peretz |
| 6,101,038 A | * 8/2000 | Hebert et al. |
| 6,271,815 B1 | * 8/2001 | Yang et al. |
| 6,445,369 B1 | * 9/2002 | Yang et al. |

FOREIGN PATENT DOCUMENTS

| JP | 1039790 | 2/1989 |
|---|---|---|
| JP | 1048074 | 2/1989 |
| JP | 2029820 | 1/1990 |
| JP | 5007183 | 1/1993 |
| JP | 8036373 | 2/1996 |
| JP | 9214430 | 8/1997 |
| JP | 9233025 | 9/1997 |
| JP | 9307839 | 11/1997 |

* cited by examiner

*Primary Examiner*—Regina Liang
(74) *Attorney, Agent, or Firm*—Jones Day

(57) ABSTRACT

A tricolor LED display system (10) is provided having a plurality of multi-color LEDs (22) that operate as concurrent display and data communication elements. These dual-use tricolor LEDs are coupled to a special-purpose computer system (12) and audio signal transmitter (16) for simultaneously controlling the visible display signal from the LEDs, and for modulating audio information onto the visible light signal emitted by the LEDs. A receiver circuit (24) receives the modulated visible light signal from the LEDs and demodulates the received signal to recover the audio information, which is then presented to a user of the system through an audio interface.

17 Claims, 4 Drawing Sheets

TRICOLOR LED DISPLAY SYSTEM HAVING AUDIO OUTPUT

RELATED APPLICATIONS

This application claims priority from provisional application serial number U.S. 60/078,685 filed Mar. 20, 1998 in the United States within one year from the filing date of this application.

FIELD OF THE INVENTION

The present invention relates to the field of LED display systems and data communications. More specifically, the invention provides a tricolor light emitting diode ("LED") display system in which the LEDs are used as concurrent display and data communication elements for displaying visible information and for transmitting modulated audio information to an associated receiver.

SUMMARY OF THE INVENTION

A tricolor LED display system is provided having a plurality of multi-color LEDs that operate as concurrent display and data communication elements. These dual-use tricolor LEDs are coupled to a special-purpose computer system and audio signal transmitter for simultaneously controlling the visible display signal from the LEDs, and for modulating audio information onto the visible light signal emitted by the LEDs. A receiver receives the modulated visible light signal from the LEDs and demodulates the received signal to recover the audio information, which is then presented to a user of the system through an audio interface.

The LED display system preferably includes a transmitter sub-system and a receiver sub-system. The transmitter sub-system may include a special-purpose computer, such as a PC, workstation or embedded computer, and an audio signal transmitter, which are both coupled to the preferred tricolor dot matrix LED display via a special interface circuit. The audio signal transmitter preferably includes a voltage-controlled oscillator for modulating the audio signal information onto the LEDs of the display. The preferred tricolor LED display is capable of generating three distinct colors—red, green and amber. The receiver subsystem may include a lens for focusing the transmitted light from the LEDs onto a photo-detector (or other optical detection means), a demodulator circuit for recovering the audio information from the modulated visible light signal emitted by the tricolor display, and an audio system for presenting the demodulated audio information to a user of the system.

According to one aspect of the invention, a tricolor LED display system is provided that includes a transmitter sub-system for simultaneously transmitting visible display signals and modulated visible light signals through a tricolor LED display, wherein the modulated visible light signals carry modulated audio information; and a receiver sub-system for receiving the modulated visible light signals and for demodulating the visible light signals to recover the transmitted audio information.

According to another aspect of the invention, a tricolor LED display system is provided that includes a tricolor LED dot matrix display having a plurality of tricolor LEDs; means for applying a display signal to the tricolor LEDs to generate a visible signal pattern; and means for applying an audio signal to the tricolor LEDs to emit a modulated visible light signal that carries the audio signal.

Still another aspect of the invention provides an interface circuit for controlling a tricolor LED display, comprising: a row counter decode system coupled to a modulated audio signal for controlling the row selection of the LEDs in the tricolor LED display; and a segment counter decode system coupled to display information for controlling the segment selection of the LEDs in the tricolor LED display. The interface may also include: a parallel port interface for receiving the display information, the display information including display data and addressing information for the LED display; an address comparison unit for comparing the addressing information for the LED display with system addressing information generated by the row counter decode system and the segment counter decode system; and a pattern storage system for storing the display data when the address comparison unit indicates that the addressing information for the LED display is the same as the addressing information generated by the row counter decode system and the segment counter decode system.

It should be noted that these are just some of the many aspects of the present invention. Other aspects not specifically listed will become apparent upon reading the detailed description set forth below.

The present invention provides many advantages overly presently known data communication systems and LED display systems. Not all of these advantages are simultaneously required to practice the invention as claimed, and the following list is merely illustrative of the types of benefits that may be provided, alone or in combination. A primary advantage of the present invention is in the use of tricolor LEDs as the concurrent display and data communication elements. This provides a data communication system that is more reliable. Because tricolor LEDs are utilized in the display of the invention, the background of the display can be energized using a color that is different from the main characters (or messages) being displayed. LEDs in a given row (regardless of color state) can be modulated with the same audio information. By constructing the system in this manner, there will always be an LED lit up in each row, thus ensuring more reliable data transmission over single-color displays, in which certain LEDs in a row have to be shut off in order to provide the correct visible display. In addition to this reliability advantage, the pattern or graphics displayed by the tricolor display will also be more attractive and flexible as more colors can be used for the display.

Other advantages of this invention include, for example: (1) a brighter display than a single-color LED display; (2) reduced noise on the modulated signal due to the design of the interface circuit and its synchronization source; (3) permits text scrolling with no effect on the transmitted modulated signal; and (4) relaxed design constraints on the receiver system.

These are just a few of the many advantages of the present invention, as described in more detail below in terms of the preferred embodiments. As will be appreciated, the invention is capable of other and different embodiments than those specifically set forth below, and its details are capable of modifications in various respects, all without departing from the spirit of the invention. Accordingly, the drawings and description of the preferred embodiments are to be regarded as illustrative in nature and not restrictive.

DETAILED DESCRIPTION OF THE DRAWINGS

Figure 1:
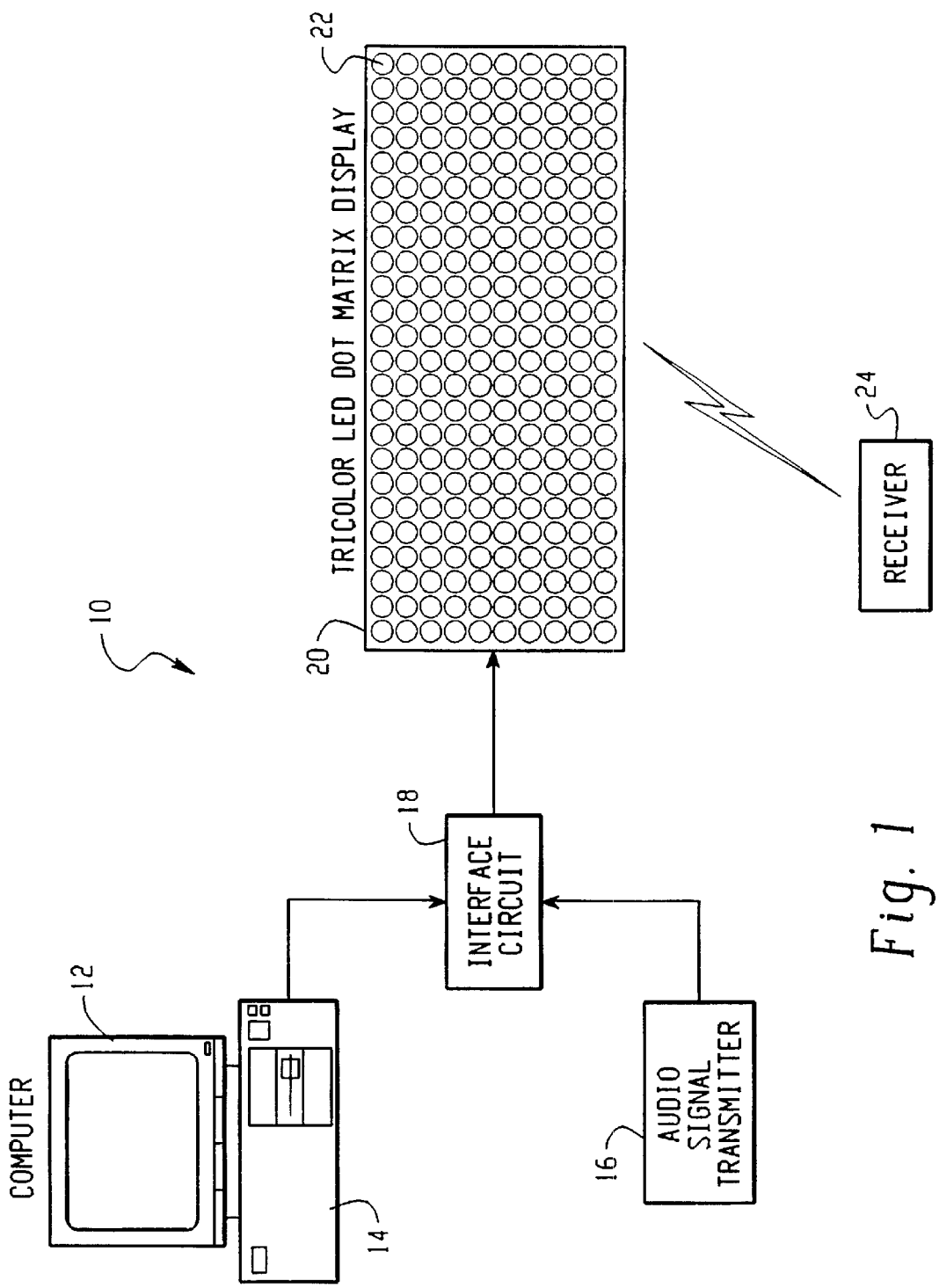
FIG. 1 is a block diagram of a preferred tricolor LED display system according to the present invention, including a transmitter sub-system and a receiver sub-system.

Turning now to the drawing figures, FIG. 1 sets forth a block diagram of a preferred tricolor LED display system 10 according to the present invention, including a transmitter sub-system 12–22 and a receiver sub-system 24. The transmitter sub-system includes a computer 12, which may be operating an executive computer program 14, an audio signal transmitter 16, an interface circuit 18, and a tricolor LED display 20 comprising a plurality of tricolor LEDs 22. The receiver sub-system 24 is described in more detail below in connection with FIG. 3.

The computer 12 could be a PC, workstation, laptop, embedded computer, or any other type of processing system capable of executing a program. The executive computer program 14 runs on the computer 12, and controls the visual display of characters, decorative patterns or messages on the display panel 20. The audio signal transmitter 16 (described in more detail below in connection with FIG. 2) generates the modulated audio signal that is applied to the LED display 20 in order to cause the LEDs 22 to emit the modulated visible light signal that carries the desired audio information. The audio signal transmitter 16 and the computer 12 are coupled to the tricolor LED dot matrix display 20 by the interface circuit 18. The coupling between the computer 12 and the interface circuit 18 is preferably a parallel data port for transporting parallel data from the computer 12 to the interface circuit 18, which uses this data to generate the appropriate display message on the tricolor LED display matrix 20. The preferred interface circuit is described in more detail below in connection with FIG. 4. The purpose of this circuit is to simultaneously control the display and data communication functions of the LED display 20.

The receiver sub-system 24 includes elements for receiving the modulated visible light signal from the tricolor display 20, and for demodulating the received signal in order to recover the desired audio information. The preferred elements of the receiver sub-system are described in FIG. 3.

Figure 2:
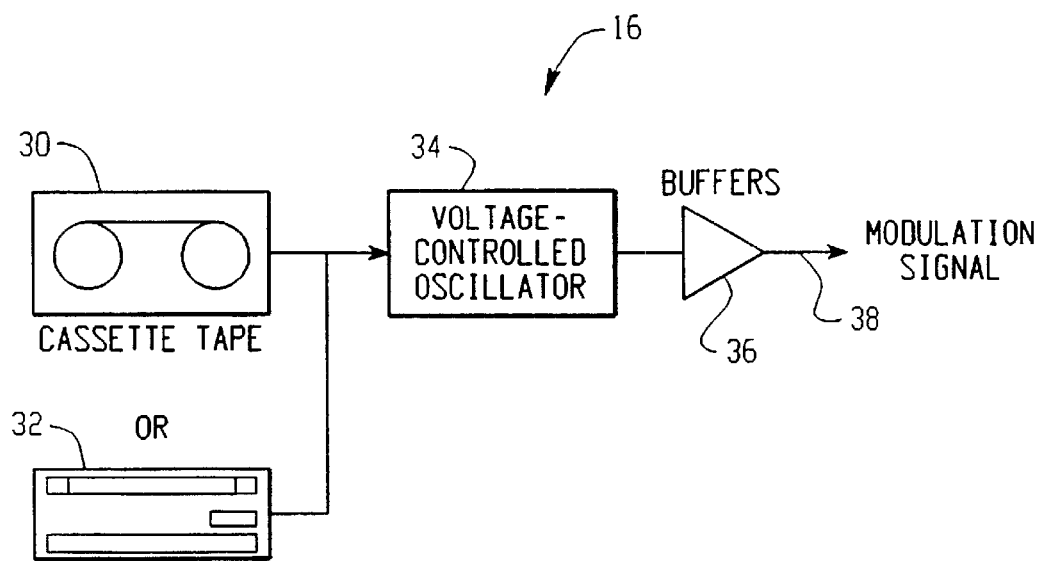
FIG. 2 is a block diagram of an audio signal transmitter, which is part of the preferred transmitter sub-system shown in FIG. 1.

FIG. 2 is a block diagram of an audio signal transmitter 16 that forms part of the preferred tricolor LED display system shown in FIG. 1. The audio signal transmitter includes a source of audio information, such as, for example, a cassette tape 30 or CD player 32, a voltage controlled oscillator ("VCO") circuit 34 and a buffer circuit 36. The output of the audio signal transmitter is a modulation signal 38, which, when applied to the LEDs 22 of the tricolor LED display 20, causes the LEDs to emit the modulated visible light signal that includes the audio information.

The cassette tape 30 or CD player 32 generates audio signals that are to be transmitted by the LED display 22. This audio signal is then fed to the VCO 34, which operates as a frequency modulator ("FM") in order to modulate the audio signal so that a modulated carrier frequency is proportional to the amplitude of the audio signal. The VCO outputs the modulation signal 38, which is applied to the LEDs 22 in order to turn the LEDs on/off at a particular frequency corresponding to the modulation signal. This frequency is high enough such that the perceivable light from the LEDs 22 appears to be constantly illuminated to the human eye. Thus, to an observer there is no indication that the LEDs of the tricolor display are operating in a concurrent manner.

Figure 3:
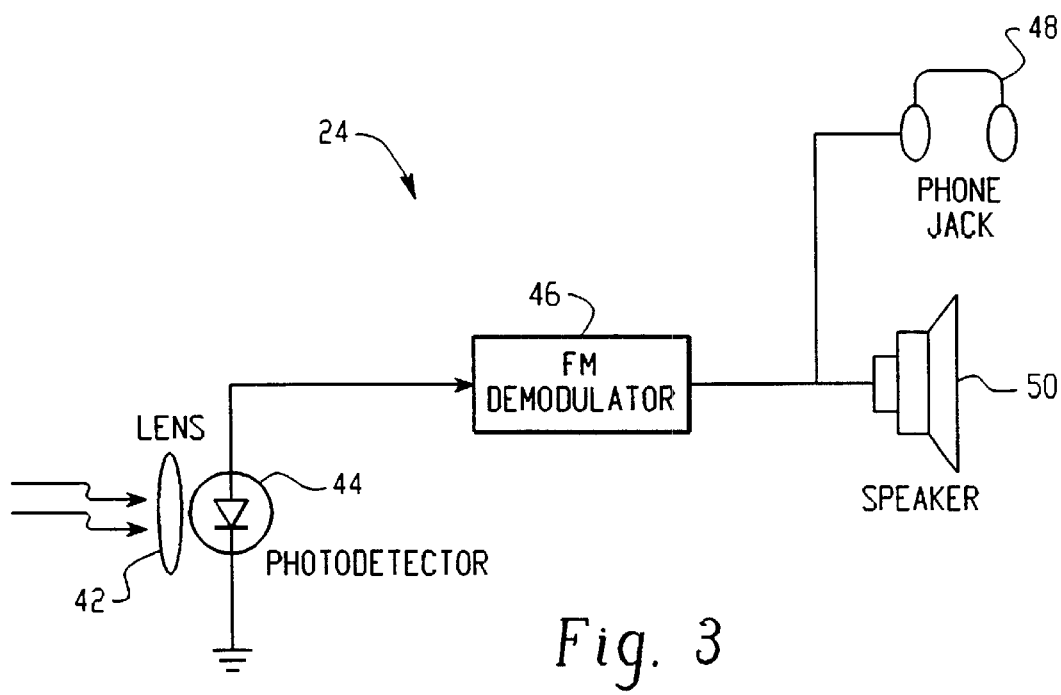
FIG. 3 is a block diagram of a preferred receiver subsystem.

FIG. 3 is a block diagram of a preferred receiver sub-system 24. The receiver sub-system 24 includes a lens 42, photo-detector 44, FM demodulator 46 and a speaker 50 and/or headphones 48. The lens 42 collects the visible light emitted by the LED display 20, including the modulated visible light signal. These light rays are then focused onto a photo-detector 44, or other type of optical detection means. The photo-detector 44 converts the modulated visible light signal into an electrical signal. The FM demodulator 46 then demodulates the modulated signal into the original audio signal generated by cassette 30 or CD player 32. A speaker 50, headphones 48 or ear jack can be used for the delivery of the audio messages or music sent from the transmitter 16. The receiver sub-system could be battery powered, such that it is portable, or could be powered by any other type of electrical system.

Figure 4:
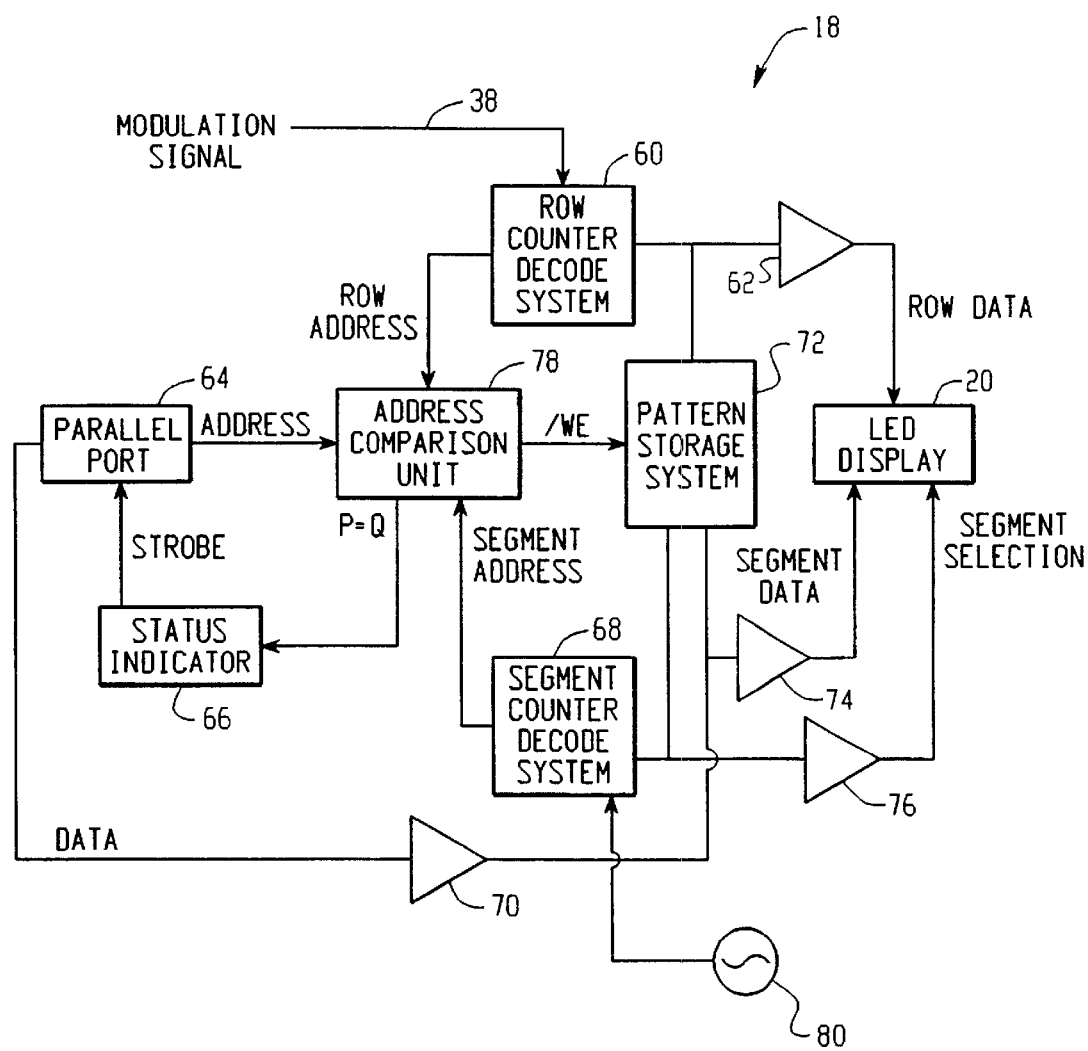
FIG. 4 is a block diagram of a preferred interface circuit, which is part of the referred transmitter sub-system shown in FIG. 1.

FIG. 4 is a block diagram of a preferred interface circuit 18 that forms part of the preferred transmitter sub-system shown in FIG. 1. This circuit 18 may include a row counter decode system 60; a parallel port interface circuit 64; a status indicator 66; a segment counter decode system 68; a pattern storage system 72; an address comparison circuit 78; and an oscillator 80. The circuit may also include one or more buffer/register circuits 62, 70, 74, 76. Three of these buffer/registers 62, 74 and 76 generate the row data, segment data and segment selection signals, respectively, that control the tricolor LED display 20. The interface circuit 18 is coupled to the computer 12 by parallel port interface 64 and to the audio signal transmitter by modulation signal 38.

The modulation signal 38 from the audio signal transmitter 16 is coupled to the row counter decode system 60, which is in turn coupled to the row data input on the tricolor LED display 20 by optional buffer/register 62. The row counter decode system 60 is used to switch among the various rows of the LED display 62, and includes a counter driven by the modulation signal 38, and a decoder for appropriate row selection.

The segment counter decode system 68 is driven by oscillator 80. It is used to switch among the segments of the LED display 20. The segment counter decode system 68 is coupled to the segment selection input on the tricolor LED display 20 by optional buffer/register 76. This circuit 68 includes a counter, which is driven by a fast oscillator 80, and a decoder for segment selection.

The pattern storage system 72 is used to store the LED display pattern of every row and segment in the matrix 20. It is preferably an SRAM, although other types of solid state memory could also be used for this part. The data pattern stored in the pattern storage system 72 is provided by the computer system 12 via parallel port interface 64.

The address comparison unit 78 takes as inputs the current row address (from the row counter decode system 60) and the segment address (from the segment counter decode system 68) and compares these addresses to the address signal from the parallel port interface 64. It compares the system-generated address (based on the two counter systems 60, 68) against the address sent out by the computer 12. This is done to ensure that the SRAM data stored in the pattern storage system 72 and the display 20 will not be disrupted until the LEDs are in the inactive state (off state). Until these address values match, new data is not written into the pattern storage system 72. The address comparison unit 78 includes a bit comparator (for comparing the bits of the address values) and a data register 70. The register holds the message data from the parallel port interface 64 until the system is ready to write data to the SRAM (i.e., when the address values match). When this occurs, the address comparison unit asserts the "/WE" line to the SRAM 72, which causes the register data 70 to be written into the pattern storage system 72. The pattern storage system outputs the segment data to the appropriate LEDs in the tricolor display 20 through an optional buffer/register circuit 74.

The status indicator 66 includes a D-type flip-flop with asynchronous preset and clear inputs. The non-inverted flip-flop output pin (strobe pin) is used to indicate a successful write operation. When this occurs (based on a signal from the address comparison unit 78), the strobe pin will be set high, which is then transmitted to the computer 12 via the parallel port interface 64 so that the computer 12 can send out the next data.

Operationally, the interface circuit 18 updates the display pattern of the tricolor LED display 20 as follows. First, the data from the computer 12 is latched into a register 70. However, the data will not be sent to the SRAM 72 input pins or the segment register 74 input pins so as not to disrupt the normal LED display process. Second, the address from the computer 12 is presented to the address comparator 78, which compares this address against the system-generated address from the row counter decode system 60 and the segment counter decode system 68. When the addresses match, the output of the comparator is pulled low (/WE), which causes the data stored in the register 70 to be written to the pattern storage SRAM 72. Once the write is complete, a signal ("P=Q") from the address comparison unit 78 is sent to the status indicator circuit 66, which sets the strobe output high, thus informing the computer 12 that the write succeeded, and that additional data may be presented to the interface circuit 18.

Having described the preferred circuit structure of the interface circuit 18, it is instructive to consider two additional operational characteristics of this design that provide advantages over presently known LED display systems. The first advantage is the use of multiple clock signals for the LED display, including a high-speed oscillator clock 80 and a modulation clock signal 38. Whenever the modulation signal changes, the active row of the LED display 20 will also be changed. Thus, the row represents a bit of information. The preferred frequency of the modulation signal is 100 kHz. Audio signal information is modulated onto this signal by the VCO 34 of the transmitter sub-system, thus resulting in a frequency range of 100=44.1 kHz.

The other timing signal used in the preferred interface circuit 18 is generated from the high-speed oscillator 18. In the preferred implementation, a 12 MHz oscillator frequency is used, although other frequencies could also be selected. This signal is used to switch between different segments of the tricolor LED display 20 (i.e., different colors in different characters). The segment clock should operate at a higher frequency than the modulation signal clock 38 so that before the modulation signal 38 is changed (i.e., before the active row is switched), all the segments have been scanned at least once and updated. Otherwise, some segments will not be lit as expected.

While the common signals 92 ("row") are changed at the frequency of the modulation signal (e.g., 100 kHz ), the segment signals 90, 94 ("column") are changed at the higher frequency of about 12 MHz. However, this 12 MHz may be divided by the segment counter 68 so that it is operating at 6 MHz. In addition, only half of the 100 kHz period of the modulation signal is used for segment selection. Therefore, during the period that a row is active, the number of times that the segment address is changed is approximated by:

$$\frac{6M}{100k} * \frac{1}{2} = 30 \qquad [1]$$

The second operational characteristic of the preferred interface circuit 18 is that updating of the pattern data is carried out during the period that the LEDs are in the off state. This eliminates any noise on the emitted LED signals by synchronizing the circuit with the modulation signal 38, including the time when the pattern is updated. The interface circuit 18 updates the display only when the row input to the LED 20 is inactive. In this manner, no noise will be injected into the modulation signal because no data will be transmitted during the pattern update process.

Figure 5:
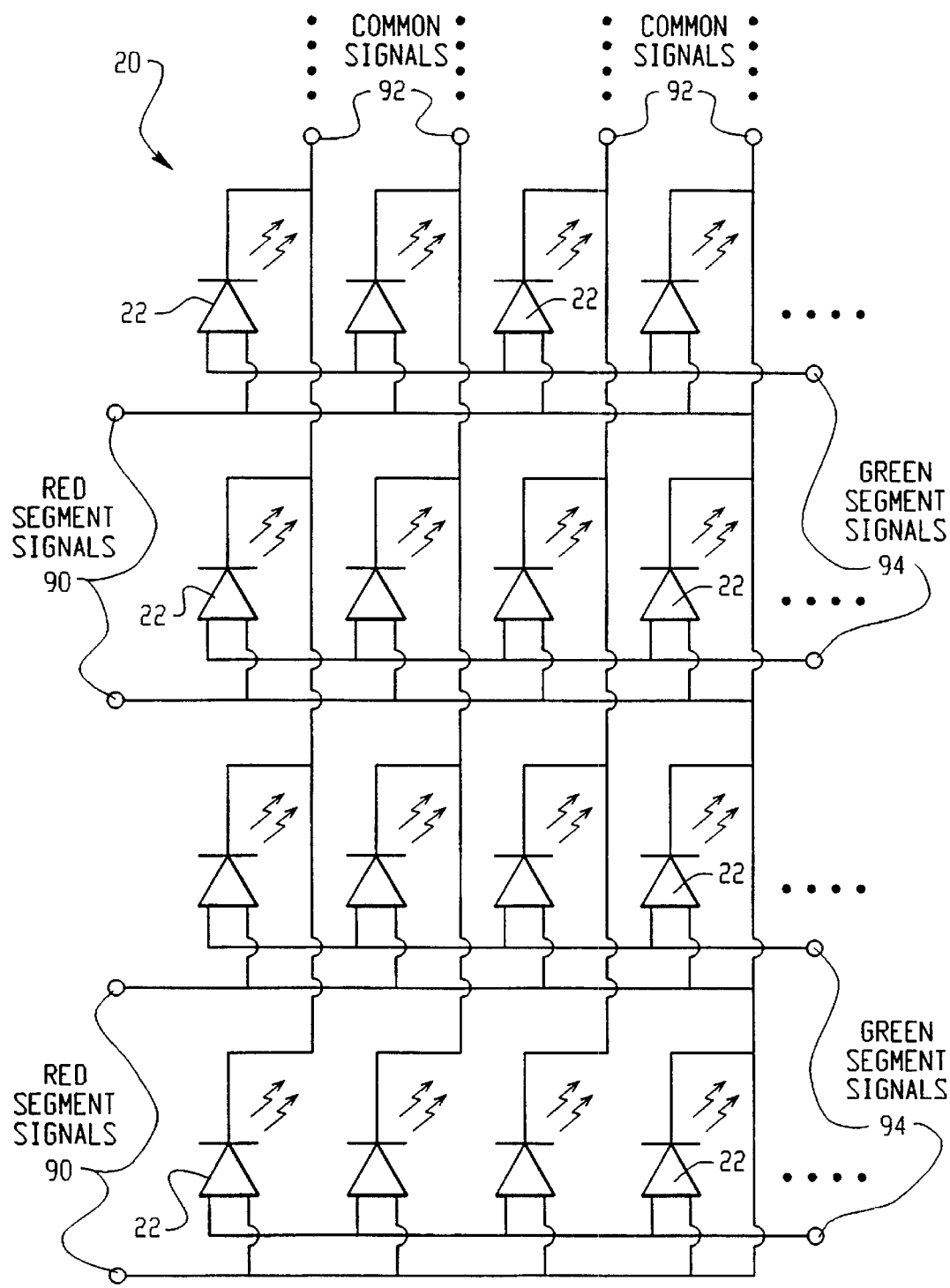
FIG. 5 is a schematic of a tricolor dot matrix display using light emitting diodes.

FIG. 5 is a schematic of a tricolor dot matrix 20 display using light emitting diodes 22 that are capable of emitting three different colors. These colors are preferably red, green and amber. The individual LEDs 22 are coupled to common signals 92, which tie the LEDs in a given row together, and two segment signals, one for red 90 and another for green 94. To energize an LED, the common signal 92 for that row is held low. Then, if a red signal is to be emitted, just the red segment 90 for the particular column is held high. If a green signal is to be emitted, just the green segment 94 for the particular column is held high. And if an amber signal is to be emitted, both the red 90 and green 94 segments are held high.

The software program 14 used for the display control and pattern update of this tricolor LED dot matrix display 20 operates as follows. For the write cycle, data is first put onto the parallel port bus coupling the computer 12 to the interface circuit 18, which latches this data. The corresponding address (i.e., row and segment data) is then put onto the same bus by the program 14. This address is compared against the system-generated address by the interface circuit 18. If the addresses match, then the message data will be written to the pattern storage system 72 of the interface circuit 18 at that address. A signal will be sent back to the computer 12, indicating a successful write. Since all the LEDs are then illuminated, it is now possible to introduce display effects, such as scrolling into the system.

The benefits of this invention can be applied to a large variety of applications. In an indoor environment, a user with an appropriate receiver system 24 could listen to the audio messages broadcast through the tricolor LEDs 22 of the dot matrix display 20. A quiet atmosphere can be maintained. A major advantage over a conventional broadcasting system is that an individual with a receiver has the freedom of choice in receiving specific messages without hearing any unwanted announcement, music or commercials.

In an outdoor environment, for example in front of a business or commercial institution on the street, the light emitted from the tricolor dot matrix LED display 20 could be used to optically transmit audio information to a user with a receiver and headphones located some distance away from the institution. With this invention, all commercial billboards could be used to transmit additional information such as daily specials, discounts, latest attractions or any merchandise, reservation telephone numbers, etc.

The preferred embodiments and several applications of the inventive system described above are presented only by way of example and are not meant to limit the scope of the present invention, which is defined by the claims. Other elements and steps could be used in place of those shown.

What is claimed:

1. A tricolor LED display system, comprising:
   a transmitter sub-system for simultaneously transmitting visible display signals and modulated visible light signals through a tricolor LED display, wherein the modulated visible light signals carry modulated audio information; and
   a receiver sub-system for receiving the modulated visible light signals and for demodulating the visible light signals to recover the transmitted audio information.

2. The system of claim 1, wherein the tricolor LED display is capable of displaying red, green and amber colors.

3. The system of claim 1, wherein the receiver sub-system includes:
   an optical sensor for receiving the modulated visible light signal from the tricolor LED display;
   a demodulator coupled to the optical sensor for demodulating the modulated visible light signal to recover the transmitted audio signal; and
   a speaker coup led to the audio signal.

4. The system of claim 3, wherein the receiver sub-system further includes a lens for focusing light emitted by the tricolor LED display onto the optical sensor.

5. The system of claim 3, wherein the optical sensor is a photo-detector.

6. A tricolor LED display system, comprising:
   a transmitter sub-system for simultaneously transmitting visible display signals and modulated visible light signals through a tricolor LED display, wherein the modulated visible light signals carry modulated audio information; and
   a receiver sub-system for receiving the modulated visible light signals and for demodulating the visible light signals to recover the transmitted audio information;
   the transmitter sub-system including:
      a computer system for generating display information;
      an audio signal transmitter for generating a modulated audio signal; and
      an interface circuit coupled to the computer system and the audio signal transmitter for applying the display information and the modulated audio signal to the tricolor LED display.

7. The system of claim 6, wherein the computer system is coupled to the interface circuit through a parallel port interface.

8. The system of claim 6, further including an executive computer program operating on the computer system for controlling the generation of display information.

9. The system of claim 6, wherein the audio signal transmitter includes:
   a source of audio information for generating an audio signal; and
   a modulator coupled to the source of audio information for generating the modulated audio signal.

10. The system of claim 9, wherein the modulator is a voltage controlled oscillator.

11. The system of claim 10, wherein the voltage-controlled oscillator operates as a frequency modulator.

12. The system of claim 6, wherein the interface circuit includes:
   a row counter decode system coupled to the modulated audio signal for controlling the row selection of the LEDs in the tricolor LED display; and
   a segment counter decode system coupled to the display information for controlling the segment selection of the LEDs in the tricolor LED display.

13. The system of claim 12, herein the interface circuit further includes:
   a parallel port interface for receiving the display information, the display information including display data and addressing information for the LED display;
   an address comparison unit for comparing the addressing information for the LED display with system addressing information generated by the row counter decode system and the segment counter decode system; and
   a pattern storage system for storing the display data when the address comparison unit indicates that the addressing information for the LED display is the same as the addressing information generated by the row counter decode system and the segment counter decode system.

14. The system of claim 13, wherein the interface circuit further includes:
   a status indicator coupled to the parallel port interface for generating a write complete signal to the computer system when the display data is written to the pattern storage system.

15. A tricolor LED display system, comprising:
   a tricolor LED dot matrix display having a plurality of tricolor LEDs;
   means for applying a display signal to the tricolor LEDs to generate a visible signal pattern; and
   means for applying an audio signal to the tricolor LEDs to emit a modulated visible light signal that carries the audio signal.

16. An interface circuit for controlling a tricolor LED display, comprising:
   a row counter decode system coupled to a frequency-modulated audio signal for controlling the row selection of the LEDs in the tricolor LED display; and
   a segment counter decode system coupled to display information for controlling the segment selection of the LEDs in the tricolor LED display.

17. An interface circuit for controlling a tricolor LED display, comprising:
   a row counter decode system coupled to a modulated audio signal for controlling the row selection of the LEDs in the tricolor LED display;
   a segment counter decode system coupled to display information for controlling the segment selection of the LEDs in the tricolor LED display;
   a parallel port interface for receiving the display information, the display information including display data and addressing information for the LED display;
   an address comparison unit for comparing the addressing information for the LED display with system addressing information generated by the row counter decode system and the segment counter decode system; and
   a pattern storage system for storing the display data when the address comparison unit indicates that the addressing information for the LED display is the same as the addressing information generated by the row counter decode system and the segment counter decode system.

* * * * *

UNITED STATES PATENT AND TRADEMARK OFFICE
CERTIFICATE OF CORRECTION

PATENT NO. : 6,683,590 B1
DATED : January 27, 2004
INVENTOR(S) : Pang et al.

It is certified that error appears in the above-identified patent and that said Letters Patent is hereby corrected as shown below:

Column 7,
Line 21, delete "coup led" and insert -- coupled --.

Column 8,
Line 4, delete "herein" and insert -- wherein --.

Signed and Sealed this

Sixteenth Day of March, 2004

JON W. DUDAS
*Acting Director of the United States Patent and Trademark Office*